United States Patent [19]

Bayha

[11] Patent Number: 5,252,682
[45] Date of Patent: Oct. 12, 1993

[54] CATIONICALLY INITIATED CURABLE RESIN SYSTEM

[75] Inventor: Charles E. Bayha, Collierville, Tenn.

[73] Assignee: Zircon Corporation, Collierville, Tenn.

[21] Appl. No.: 992,537

[22] Filed: Dec. 17, 1992

[51] Int. Cl.$^5$ .............................................. C08F 20/00
[52] U.S. Cl. .................... 525/445; 528/272; 528/296; 528/298; 528/300; 528/301; 528/302; 528/303; 528/306; 528/307; 525/437; 525/447; 525/448; 525/451; 524/175; 524/183; 524/186; 522/25; 522/27; 522/28; 522/29; 522/31; 522/32; 427/340; 427/372.2; 427/385.5; 428/482
[58] Field of Search ............... 528/272, 296, 298, 300, 528/301, 302, 303, 306, 307; 525/437, 445, 447, 448, 451; 524/175, 183, 186; 522/25, 27, 28, 29, 31, 32; 427/340, 372.2, 385.5; 428/482

[56] References Cited

U.S. PATENT DOCUMENTS

| 4,749,807 | 6/1988 | Lapin et al. | 568/91 |
| 4,751,273 | 6/1988 | Lapin et al. | 525/455 |
| 4,775,732 | 10/1988 | Lapin | 528/49 |

FOREIGN PATENT DOCUMENTS 0322808 7/1989 European Pat. Off.

Primary Examiner—Samuel A. Acquah
Attorney, Agent, or Firm—Spencer, Frank & Schneider

[57] ABSTRACT

A cationically initiated curable resin system is provided using polyester dicyclopentadiene oligomer blended with monomer having vinyl ether end groups and a cationic initiator. A process for preparing the resin system and a process of coating are also provided.

8 Claims, No Drawings

CATIONICALLY INITIATED CURABLE RESIN SYSTEM

BACKGROUND OF THE INVENTION

1. Field of the Invention

The present invention relates to curable resin systems.

2. Discussion of background technology

Monomers based on vinyl ethers have the following formula:

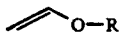

where R is an organic moiety. These compounds will polymerize with cationic initiators (acid catalysis) and will cure fairly rapidly; however, for film application, properties tend to be sub-standard due to the absence of polymeric oligomers which improve the tensile elastic characteristics of the coating. Epoxy, epoxy acrylate and urethane acrylate oligomers normally used in ultraviolet radiation cured coatings do not react well with vinyl ethers.

U.S. Pat. No. 4,775,732 discloses vinyl ether terminated ester and urethane resins from bis(hydroxyalkyl)-cycloalkanes which cure by radiation-induced cationic polymerization. U.S. Pat. No. 4,749,807 discloses vinyl ester oligomers, and U.S. Pat. No. 4,751,273 discloses vinyl ether terminated urethane resins. EP-A-0 322 808 discloses a liquid radiation curable composition comprising an unsaturated polyester component and a non-polymerized, co-curable vinyl ether component containing at least two vinyl ether groups.

Cationic initiators are based on onium salts which, when exposed to ultra-violet radiation, decompose to a free radical and a powerful friedel-crafts acid. It is the acid that initiates and promotes cure. Cationic initiators were designed initially to be used with epoxy-type oligomers and monomers. A number of aliphatic based oligomers and resins cure with these types of initiators, and although excellent film and adhesion properties can be obtained, cure rates are quite slow as compared to a conventionally initiated acrylate system. The cost of using a cationic initiated system is often excessive.

SUMMARY OF THE INVENTION

An object of the present invention is to provide novel compositions of a cationically initiated curable resin system comprising a polyester dicyclopentadiene oligomer, a monomer based on divinyl ether, and a cationic initiator, which may be utilized in various commercial applications.

A further object of this invention is to provide a process for preparing a cationically initiated curable resin system by dissolving a polyester dicyclopentadiene oligomer in a monomer based on divinyl ether as a reactive thinning solvent, and polymerizing the monomer based on divinyl ether with a cationic initiator.

A further object of the present invention is to provide a method of coating, comprising applying a film of a curable composition of the invention to a substrate, and curing the composition by exposing the film to electron beam radiation, heat activated peroxide cure, room temperature peroxide cure, free radical ultraviolet initiation or cationic ultraviolet initiation.

DETAILED DESCRIPTION OF THE INVENTION

The present invention uses polyester dicyclopentadiene (DCPD) oligomers blended with monomers based on vinyl ethers to obtain fast cure speeds and excellent film properties at reasonable cost. A cationically curable resin system is provided comprising a polyester dicyclopentadiene oligomer, a monomer based on divinyl ether, and a cationic initiator.

Vinyl ethers are electron rich due to the oxygen adjacent to the double bond. Maleic and/or fumaric esters have double bonds that are electron deficient due to the electron withdrawing effects of the carbonyl groups.

Electron Rich Double Bond
$-O-CH=CH_2$

Electron Poor Double Bond
$$-O-\overset{O}{\underset{\|}{C}}-C=C-\overset{O}{\underset{\|}{C}}-O-$$

When double bonds of these types of electron configurations are combined, reaction can be initiated by acid catalysis.

Using the monomers based on vinyl ethers as reactive and thinning solvents, polyester dicyclopentadiene oligomers are dissolved and formulated to produce a cationically initiated ultra-violet cured resin system that is fast curing in thin films and that results in a film with excellent properties at low cost. A process for preparing a cationically initiated curable resin composition is provided by dissolving a polyester dicyclopentadiene oligomer in a monomer based on divinyl ether as a reactive thinning solvent, and polymerizing the monomer based on divinyl ether with a cationic initiator.

The advantages of the present invention's cationically initiated curable resin system include the following:

1. Low Cost—polyester dicyclopentadiene oligomers significantly cuts the over-all cost.

2. Air-inhibition—Since the polymerization is acid catalyzed, little or no air inhibition occurs. Surface cure is similar to an acrylate system and not a polyester system. These systems are suitable for electron beam curing.

3. Cure Speed—Cure is very rapid in thin films, unlike these same polyesters thinned with acrylated monomers.

4. Adhesion—Cure has always been a problem with ultra-violet cured systems due to the effect of a cured surface screening out the ultraviolet, thus causing poor interface cure and poor adhesion. Ultra-violet radiation only initiates the cationic polymerization. In the present invention, the coatings will continue to cure after the curing radiation source such as the ultra-violet light has been removed. Curing of the interface, especially with metal substrates, is complete and therefore provides the maximum adhesion that the system is capable of providing.

5. Low Toxicity—Acrylated polymers and monomers have varying degrees of toxicity. Some monomers are severe skin irritants and some are either carcinogens or mutagens. Divinyl ethers are low in toxicity. In addition, they are low in viscosity and odor. They make excellent diluent monomers. The present invention's dicyclopentadiene polyesters have similar properties, but with all of the virtues of a hydrocarbon resin.

6. Weathering—Since the dicyclopentadiene polymers are cycloaliphatic, weathering properties are excellent. Cationic initiation provides the cured film with superior gloss and less yellowing on exposure to the sun rays.

7. Pigment/Filler Wet Out—Unlike epoxy or urethane systems, dicyclopentadiene based systems exhibit excellent pigment and filler wet out properties. Dispersibility of pigments is greatly enhanced with dicyclopentadiene based oligomers.

8. Chemical Resistance—Cycloaliphatic hydrocarbon resins are usually low in specific gravity and hydrophobic in nature. The low specific gravity allows a fabricator to use less weight per gallon of material and the hydrophobic (water repelling) characteristic renders excellent stain resistance to the cured film.

The following are examples of three types of polyester dicyclopentadiene based oligomers used in the present invention.

TYPE I—ADDITIVE

Type I polyester dicyclopentadiene based oligomers are based on the reaction of dicyclopentadiene and maleic acid (M.A.). A precursor intermediate, adduct A, is formed:

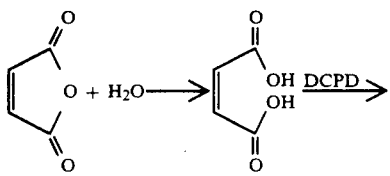

Acid catalysis is usually not necessary but to obtain complete conversion to the intermediate, catalyst such as BF3 etherate or p-toluenesulfonic acid can be employed. About 7% of the dicyclopentadiene exists in the "exo" form and either will not react or will form the "exo" intermediate which reacts sluggishly in subsequent polymerizations. The favored structural form probably exists in the axial, trans configuration to the adjacent five-membered ring double bond. Some hydrogen bonding probably occurs with this double bond accounting for the difficulty of converting the maleate form to the fumarate form.

With the Type I polyester dicyclopentadiene based oligomer, maleic acid must be used as the reacting acid moiety. Fumaric acid either does not react with dicyclopentadiene in this manner or reacts very slowly. Once the dicyclopentadiene has reacted with maleic acid, the monofunctional remaining acid group can be reacted with a variety of alcohols, glycols and polyols. For example,

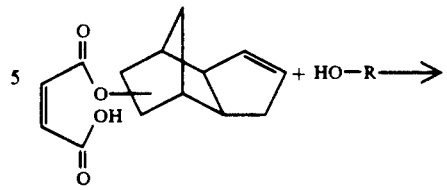

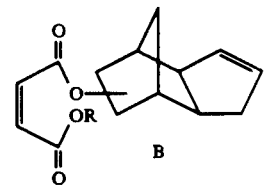

where R is an organic moiety.

With alcohols, diesters are formed with dicyclopentadiene group forming one end. Typical alcohols include methanol, ethanol, isopropyl alcohol, amyl alcohol, hexanol, iso-octyl alcohol, 2-ethyl hexanol, benzyl alcohol, allyl alcohol, trimethanol propane diallyl ether, triethylene glycol monovinyl ether, monoethanol amine, dimethyl ethanol amine to name a few. These adduct are usually low in viscosity and exhibit little tendency to increase in molecular weight.

With glycols, an adduct C is initially formed which can be converted to adduct D by controlling the ratios of adduct A to the glycol. If stoichiometric quantities of adduct A and the glycol are employed, adduct C alcohol predominates:

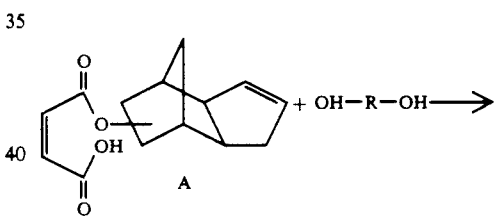

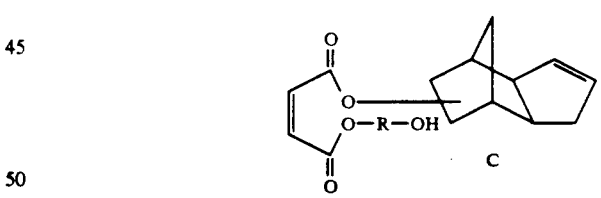

where R is an organic moiety.

If, however, a 1 molar excess of adduct A is employed, then adduct D predominates:

where R is an organic moiety.

The glycols that can be used include (1) the propylene glycol types, e.g. propylene glycol, dipropylene glycol, tripropylene glycol, tetrapropylene glycol, polypropylene glycol, neopentyl glycol, dibromo neopentyl glycol and trimethyl propane diol, (2) the ethylene glycol types, e.g. ethylene glycol, diethylene glycol, triethylene glycol, tetra-ethylene glycol, polyethylene glycol, (3) parafinic glycols, e.g. 1,4 butanediol, 1,5 pentanediol, 1,6 hexanediol, 1,7 heptanediols, 1,8 octane diol, 1,9 nonanediol, 1,10 decanediol, (4) aromatic glycols, e.g. ring glycols, e.g. cyclohexane dimethanal, 1,2 dihydroxycyclohexane.

Although the adduct C shows little tendency to grow in molecular weight, adduct D will increase in molecular weight via heat or under acid catalysis. The polymerization is independent of esterification and proceeds by an "ene" type reaction. The "ene" reaction occurs only in the absence of glycol and only if the adduct D is in the fumarate form.

With trifunctional pblyols such a trimethanol propane and glycerine, rapidly molecular growth occurs. In order to prevent gelation, reduced cook temperature conditions must be used as well as running the esterification in the absence of acid catalysts. "Ene" type reactions are difficult to control with triols and therefore are undesirable:

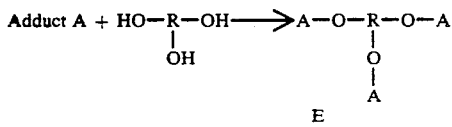

where R is an organic moiety.

There is an alternative method for utilizing type I chemistry without the need for "ene" chemistry. Adduct A can be employed as an end-capping agent.

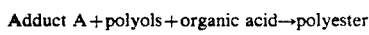

Molecular weight dispersity can be more accurately controlled and physical properties can be more easily varied than with adduct-ene approach.

Similar glycols can be used as were already mentioned. Acids include maleic, isophthalic, orthophthalic adepic, benzoic, acrylic, methacrylic, glutaric pemelic, suberic, azelaic, sebactic, para phenylene acid, diacetic acid, paraphenylene dipropionic, 4,4 dibenzylic acid, 5-t-bulylisophthalic acid, 1,6 naphthalene dicarboxylic acid.

Preferred acid is maleic.

By controlling reaction conditions, little or no Diels-Alder reaction occurs, thus keeping the maleate group intact.

Although the remaining group has little tendency to react with a second dicyclopentadiene, some side reactions do occur.

1. Polymer formation—undefined polymer derived from either dicyclopentadiene or cyclopentadiene is formed when maleic acid reacts with dicyclopentadiene. This material contains little or no active double bonds and can be extracted from the reaction mass.

2. Adduct formation—when stoichiometric amount of maleic acid and dicyclopentadiene are reacted some of the maleate double bonds are consumed to form the product, F, illustrated below:

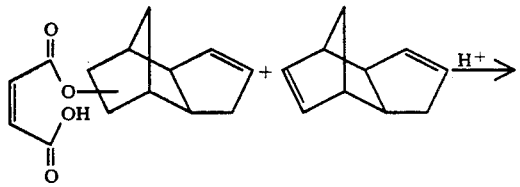

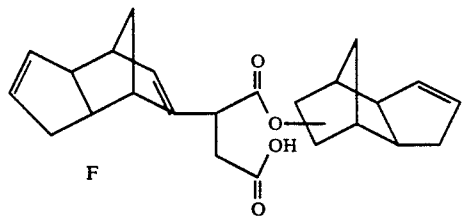

Dicyclopentadiene can also react in a similar manner with alcohols and polyols.

Type I-Additive polyester dicyclopentadiene based oligomers have the following characteristics relative to Type II: rigid, fast curing, excellent adhesion, yellow in color (Gardner 2-8), low air inhibition, mirror-like film surface, excellent compatibility, hydrocarbon odor, excellent chemical resistance, and yellows with heat.

TYPE II

Type II polyester dicyclopentadiene based oligomer preparation involves the formation of an ether, adduct G, illustrated below:

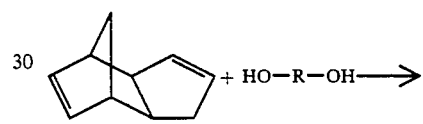

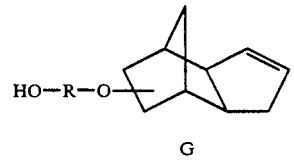

where R is an organic moiety.

This reaction is slower and does require an acid catalyst. Once the dicyclopentadiene has been functionalized, further adduct or polymer formation can be accomplished. For example,

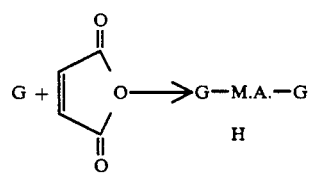

Intermediate H has little or no tendency to increase molecular weight by "ene" reactions. Molecular weight buildup must be accomplished via the end-capping techniques previously discussed. These type of polyesters tend to be highly chemical resistant and low in specific gravity.

TYPE III

Type III polyester dicyclopentadiene based oligomer preparation utilizes the same raw materials as types I and II, but the reaction pathway, as illustrated below, is quite different.

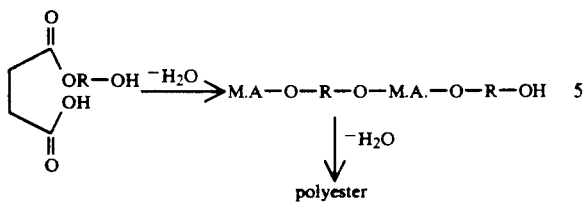

Upon completion of the maleate polyester condensation dicyclopentadiene is added at temperature exceeding the "cracking" reaction of dicyclopentadiene. Enough cyclopentadiene is produced to react with a maximum of 60 mole percent of the maleic ester to form the nadic acid (N.A.) ester. The result is a nadic/maleic ester:

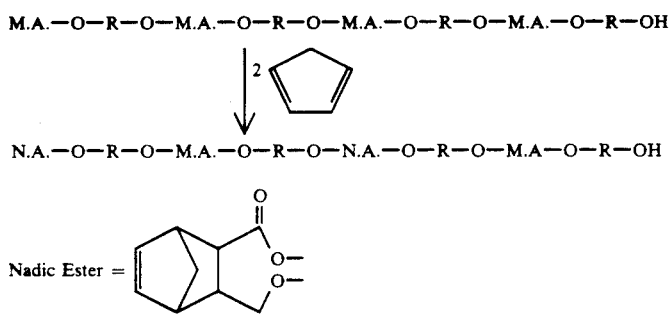

where R is an organic moiety.

Once the nadic is formed, the remaining maleic esters are converted to fumarate esters with heat (215° C.) Molecular weight is controlled by the ratios of acid/glycol starting materials.

This type of polyester is similar to phthalic based systems in that the nadic moieties are used in place of the phthalic groups.

The dicyclopentadiene polyesters are versatile. They can be cured using free radical U.V. initiation, cationic U.V. initiation, electron beam radiation, heat activated peroxide cure, and room temperature peroxide cure.

The monomer used with these types of polyester dicyclopentadiene based oligomer are of the generic category of divinyl ethers, of the structure:

where R is an organic moiety.

For the most part these monomers are difunctional and commercially available. Reaction sequence involves the use of a glycol and acetylene with finely divided potassium hydroxide. Examples of two vinyl ether monomers are triethylene glycol divinyl ether and dimethanol cyclohexane divinyl ether.

Although the major monomers for this type of cationic cure are divinyl ethers, conventional ultra-violet curing monomers such as trimethanol-propane triacetylate or tripropylene glycol diacrylate can be used as secondary co-reactants, providing conventional ultra-violet initiators based on benzoin ethers are employed.

The cationic initiators are based on onium salts of the formulation:

1. Diazonium salts

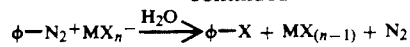

-continued $\phi-N_2^+ MX_n^- \xrightarrow{H_2O} \phi-X + MX_{(n-1)} + N_2$

2. Diaryliodonium salts

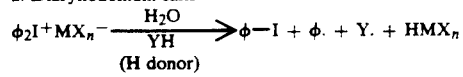

$\phi_2 I^+ MX_n^- \xrightarrow[YH]{H_2O} \phi-I + \phi. + Y. + HMX_n$
(H donor)

3. Triarylsulphonium salts

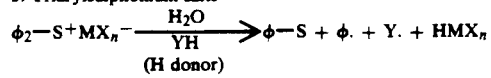

$\phi_2-S^+ MX_n^- \xrightarrow[YH]{H_2O} \phi-S + \phi. + Y. + HMX_n$
(H donor)

where, $MX_n^- = BF_4, PF_6, AsF_6, SbF_6$.

These salts are dissolved in an appropriate carrier solvent for formulation ease. The commercial type used in subsequent formulations is based on triarylsulphoneium salts.

Ultra-violet co-initiators used are based on one or a combination of the structures illustrated below:

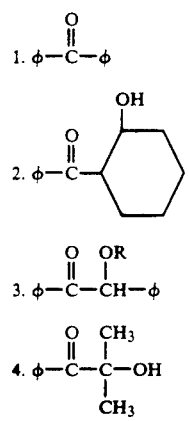

The following examples are compositions of cationically curable resins according to the present invention:

EXAMPLE I

POLYESTER DICYCLOPENTADIENE BASED OLIGOMER TYPE I—"ENE"

To form type I polyester dicyclopentadiene based oligomer based on Adduct C, add 1845.6 gms of pure dicyclopentadiene (Exxon, 97% purity) and 277 gms of water and 43.2 gms of ethylene glycol to a 1 gal kettle equipped with mechanical stirrer, a condensing "column" with water cooled distillate collector, an inert gas inlet tube and a temperature sensing device. Add 0.4 gm of hydroquinone and 4 gms of oxalic acid. Heat to 50°-60° C. under light nitrogen blanket. Add 1370.0 gms of molten maleic anhydride in three shots maintaining temperature below 120° C. with cooling. Hold at 125° C.±5° C. for 2 hours. Analysis of the mix indicates about an 80% conversion to Adduct A. Free dicyclopentadiene is 2-3%. Acid number is 120-130. Add 741 gms of diethylene glycol and begin heating to 200° C. Water will begin distilling off at 140°-150° C. When the temperature reaches 200° C. most of the water will be removed. Excess dicyclopentadiene will also azeotrope with the water. When the acid number is 50 or below, remove condenser column and go to main vent and nitrogen sparge. The pot temperature is raised to 215° C. and a viscous glycolated Adduct A based on the "exo" dicyclopentadiene is removed. In addition, maleic conversion to fumarate is 90-95% complete. When the acid number is 25 or less and the gardner bubble viscosity of a 60/40 resin/styrene blend is B-C, the reaction mass is cooled to 150° C. or less and removed as solids or thinned with monomer. If the oligomer is thinned, tolylhydroquinone in the 100-500 ppm (based on the thinned resin) must be used. This oligomer is a yellow, hard solid at room temperature. Number molecular weight range is 1000-1200 by G.P.C. analysis.

Molar ration of the dicyclopentadiene, maleic anhydride and diethylene glycol is as follows:

| Maleic anhydride: | 2.0 moles |
| Dicyclopentadiene: | 2.0 moles |
| Diethylene Glycol: | 1.0 moles |
| Glycol Excess (optional) | 0.1 moles |

Although the example above is based on maleic anhydride and diethylene glycol, other acids and anhydrides may be used. For reactivity purposes some level of maleic anhydride has to be employed. Excess glycol additions are optional depending on the desired final acid number of the oligomer.

EXAMPLE II

Polyester Type I—End Capped

To form Type II—end capped polyester based on Adduct C, add 1589.6 gms. of maleic anhydride, 50.4 gms. of ethylene glycol, to a 1 gal. kettle equipped with a mechanical stirrer, air condenser, inert gas inlet and sample port. Melt maleic anhydride at 60-70° C. Add 328.5 gms. water in three shots, maintaining the temperature between 90°-100° C. After the addition of water, 1070.4 gms. of dicyclopentadiene (Exxon, 97% purity) is added in three shots maintaining the temperature at 110°-130° C. After the addition of the dicyclopentadiene, the mix is held for 2 hours at 125° C.±5° C. Free dicyclopentadiene is 0.5% to 1.0% and the acid number is 250-300. Add 1289.6 gms. diethylene glycol and cook at 200° C. under an inert gas blanket. H₂O will begin to distill out at 135°-140° C. Lower levels of excess dicyclopentadiene will also azeotrope at this time. When the acid number is 50 or below, remove the air condenser and go to inert gas sparge. Adjustments with the rate of inert gas may be necessary to remove volatiles to achieve the 50 acid number of less. Additions of low levels of glycol may also be necessary. Raise the temperature to 215° C. and cook until the Gardner bubble viscosity at 40% styrene blend is B - C. Cool to 150° C. and add 50 ppm tolylhydroquinone. Remove as solids or thin with monomer. Momo, t-butyl hydroquinone in the 100-500 ppm must be added to the monomers prior to thinning. This oligomer is a soft, solid at room temperature. Number molecular weight is 900-1000 by G.P.C. analysis.

The molar ratio of dicyclopentadiene, maleic anhydride and glycol is as follows:

| Maleic anhydride: | 2.0 moles |
| Dicyclopentadiene | 1.0 moles |
| Diethylene Glycol | 1.5 moles |
| Excess Glycol (optional) | 0.1 moles |

As in Example I, many different glycols and acids may be used.

EXAMPLE III

Polyester Type II—Ether Based

To form Type II—ether formation based on Adduct G, add 1592.8 gms. diethylene glycol, 93.2 gms. ethylene glycol, 1.0 gm. p-toluenesulphonic acid and 4.0 gms. ocalic acids to a 1 gal. kettle equipped as in Example I. Heat to 150° C. Slowly add 1322.4 gms. of dicyclopentadiene (Exxon, 97% pure) over a one hour period, maintaining the temperature between 140°-160° C. Hold the mix at this same temperature for 3 hours. Free dicyclopentadiene is 3% to 5%. Cool to 120°-130° C. and slowly add 204.5 gms. water. Kettle temperature is less than 100° C. Add 991.6 gms. maleic anhydride and cook at 200° C. until the acid number is less than 50. Most of the water and all of the free dicyclopentadiene will be removed. Switch to main vent and sparge with inert gas until Gardner bubble viscosity at 40% styrene is B - C, and the acid number is 25 or less. Cool to 150° C. and remove. Solids can be thinned with monomer containing 100-500 ppm of tolylhydroquinone. This oligomer is dark yellow, soft solid at room temperature. Number molecular weight range is 800-1000 by G.P.C. analysis. The molar ratio of dicyclopentadiene, maleic anhydride and diethylene glycol is as follows:

| Maleic anhydride: | 2.0 moles |
| Dicyclopentadiene: | 2.0 moles |
| Diethylene Glycol: | 3.0 moles |
| Glycol Excess (optional) | 0.3 moles |

As with the previous Examples, other acids and glycols can be substituted. Some maleic anhydride or its equivalent must be used. Excess glycol additions are optional depending on the desired final acid number and molecular weight of the oligomer.

EXAMPLE IV

Polyester Type III

Type III polyester involves the formation of nadic esters formed in situ via Diels-Alder condensations. A low molecular weight polyester is first synthesized, followed by a Diels-Alder reaction. Thus, 346.1 gms. of H20,1,674.0 gms. maleic anhydride, 1810.8 gms. of diethylene glycol and 105.8 gms. of ethylene glycol was charged into a one gallon kettle equipped as in Example I. The mix is heated to 200° C., removing the reaction water and the charge water. When the acid number is less than 50, the inert blanket is switched to inert sparge. With heavy sparging the acid number was reduced to less than 30. The number molecular weight at this stage ranges between 900-1000. Conversion of the maleinate to fumarate is in excess of 70%. The temperature is lowered to 160° C. with cooling and 563.8 gms. of dicyclopentadiene is slowly added in 3 shots to the mass through the sparge tube. The temperature is raised to 170°–180° C. and held for 1.5 hours. Excess dicyclopentadiene is less than 0.5%. The temperature is raised to 215° C. and sparged until the acid number is less than 20 and the Gardner bubble viscosity at 40% styrene is B - C. The mass is cooled to 160° C. and removed as solids or thinned with monomer containing 100–500 ppm of tolylhydroquinone, based on the thinned resin. Number molecular weight of the oligomer is in the 1100–1300 range molecular weight of the oligomer is in the 1100–1300 range by G.P.C. analysis.

The molar ratio of the dicyclopentadiene, maleic anhydride and diethylene glycol is as follows:

| Maleic Anhydride | 2.0 moles |
|---|---|
| Dicyclopentadiene | 0.5 moles |
| Diethylene Glycol | 2.0 moles |
| Excess Glycol (optional) | 0.2 moles |

The above polyester contains 50% molar nadic ester. The percentage of nadic in the polyester can vary from 1% to 100% depending on the level of dicyclopentadiene added. With the type III polyester, maleic anhydride must be used in order to form the nadic moiety. However, other glycols than diethylene glycol can be used as well as other secondary acids.

The following are formulations of cationically curable resins according to the present invention:

EXAMPLE V

| Polyester Oligomer - Type I "ENE" (Example I) | 50 wt. % |
|---|---|
| Divinyl Ether Monomer (G.A.F., DVE-3) | 50 wt. % |
| Cationic initiator | 1–3 pph |

EXAMPLE VI

| Polyester Oligomer - Type I, End Capped (Example II) | 50 wt. % |
|---|---|
| Divinyl Ether Monomer (G.A.F., DVE-3) | 50 wt. % |
| Cationic Initiator (3M, FX F12) | 1–3 pph |
| Ultraviolet Cure Initiator (Duracure 1173) | 1–3 pph |

EXAMPLE VII

| Polyester Oligomer - Type III Nadic (Example VI) | 50 wt. % |
|---|---|
| Divinyl Ether Monomer (G.A.F., DVE-3) | 50 wt. % |
| Cationic Initiator (3M - FX512) | 1–3 pph |

EXAMPLE VIII

| Polyester Oligomer - Type III Nadic (Example IV) | 50 wt. % |
|---|---|
| Divinyl Ether Monomer (G.A.F., DVE-3) | 25 wt. % |
| Trimethanol Propane Triacrylate (CPS) | 25 wt. % |
| Cationic Initiator (Union Carbide, UV) | 1–3 pph |
| Benzophenone | 6–8 pph |

The above formulations use a divinyl ether of the general structure:

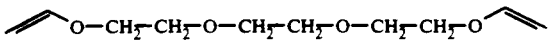

Both the 3M and Union Carbide cationic initiators are based on the structure below and are in carrier solvents:

The Duracure 1173 U.V. initiator is representative of benzoin type material of structure:

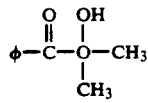

In each above Example, the liquid formulations are drawn down with a number 5 bar on paper and metal. Cure is accomplished with a 200 watt ultra-violet lamp as supplied by American Ultra-Violet. In every case, the film is exposed to 500 millijoules energy as measured with a radiometer. The cured films pass 50+M.E.K. rub test. All the films exhibited 100% adhesion on treated steel after 2 hours of exposure and 95% gloss at 60° C. with a Gardner Gloss meter.

While the invention has been described in connection with specific embodiments thereof, it will be understood that is capable of further modification and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

I claim:
1. A cationically initiated resin composition comprising:
   a) a polyester dicyclopentadiene oligomer,
   b) a monomer based on divinyl ether, and
   c) a cationic initiator.
2. The cationically initiated resin composition as recited in claim 1, wherein said polyester dicyclopentadiene oligomer is based on the addition polymerization of dicyclopentadiene and maleic acid and the addition of a glycol.
3. The cationically initiated resin composition as recited in claim 1, wherein said polyester dicyclopentadiene oligomer comprises about 50% nadic/50% maleic acid polyesters and a glycol.
4. A process for preparing a cationically initiated resin composition comprising:
   a) dissolving a polyester dicyclopentadiene oligomer in a monomer based on divinyl ether as a reactive thinning solvent; and
   b) polymerizing said monomer based on divinyl ether with a cationic initiator.
5. The cationically initiated resin composition as recited in claim 1, wherein said monomer based on divinyl ether is selected from the group consisting of triethylene glycol divinyl ether and dimethanol cyclohexane divinyl ether.
6. The cationically initiated resin composition as recited in claim 1, wherein said cationic initiator is based on an onium salt.

7. The cationically initiated resin composition as recited in claim 1, wherein said cationic initiator is selected from the group consisting of diazonium salts, diaryliodonium salts, and triarylsulphonium salts.

8. A cationically initiated resin composition, comprising:
(a) a polyester cyclopentadiene oligomer comprising about 50% nadic/50% maleic acid polyesters and a glycol;
(b) a monomer selected from the group consisting of triethylene glycol divinyl ether and dimethanol cyclohexane divinyl ether; and
(c) a cationic initiator comprising an onium salt.

* * * * *